May 14, 1935. A. C. DURDIN, JR 2,000,899
AUTOMATIC CONTROL MECHANISM FOR ELECTRIC MOTORS
Filed Feb. 17, 1930
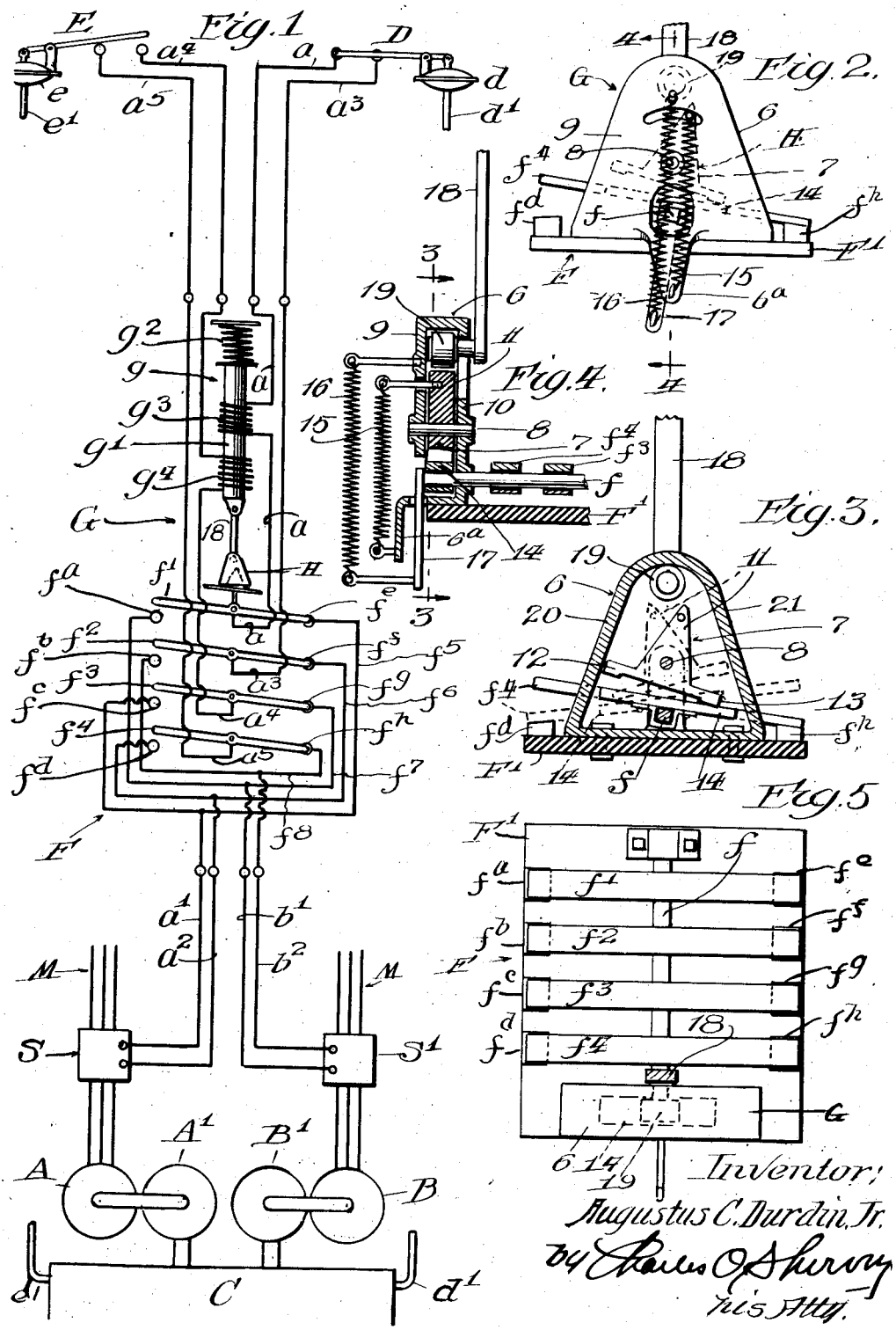

Patented May 14, 1935

2,000,899

UNITED STATES PATENT OFFICE 2,000,899

AUTOMATIC CONTROL MECHANISM FOR ELECTRIC MOTORS

Augustus C. Durdin, Jr., Chicago, Ill., assignor to Chicago Pump Company, Chicago, Ill., a corporation of Illinois Application February 17, 1930, Serial No. 429,047

23 Claims. (Cl. 172—239)

This invention relates to automatic control mechanism for electric motors, and its principal object is to provide automatic control means for a plurality of electric motors, whereby one or the other of the motors is automatically started upon the taking place of a change of some condition in the system with which the motors are used, and whereby the running motor is automatically stopped when the former condition in the system has been restored.

There are many installations where two or more electric motors are provided for performing certain work, and under normal conditions only one motor is required to operate at a time to perform the necessary work. For the purpose of distributing the work among the several motors, it is customary to operate them at some predetermined sequence, for instance, if two motors are employed they are caused to operate alternately, or one motor may be caused to operate a number of times in succession after which, the other motor may be caused to operate a number of times in succession, etc.

In accordance with the present invention, an automatically acting electric switch is provided for closing and opening the circuits to the several motors one at a time, which switch is set to automatically close the circuit to any of the motors upon the taking place of a change of some condition in the system which effects the operation of the switch. The switch operates in conjunction with sequence controlling mechanism (which controls the circuits from said switch to the several motors) in such manner that they will be started alternately or in some other regular sequence, and stopped when their work has been performed. In accordance with another phase of the invention, a second automatically acting electric switch is provided, whereby an idler motor is automatically started in case the active motor is unable to perform all of the work required of it.

Another object of the present invention is to provide novel means for actuating the sequence controlling mechanism and operating as a result of the closing of the automatic switch, to store up energy, which is subsequently employed to actuate the sequence controlling mechanism upon the opening of said automatic switch, and consequently, at the time the motor or motors are not in operation. Another object is to provide actuating means for the sequence controlling mechanism capable of operation, as above set forth, and electrically connected to two automatic switches. Another object is to provide simple and comparatively inexpensive mechanism for actuating the sequence controlling mechanism which requires no attention and which is not likely to get out of order.

The invention consists, therefore, in automatic control mechanism for a plurality of electric motors having actuating means for actuating the sequence controlling mechanism and embodying an electro-magnetic device operating to actuate the sequence controlling mechanism when deenergized. It further consists in actuating means for sequence controlling mechanism having an electro-magnetic device arranged in circuits controlled by two automatically acting switches and operating to actuate the sequence controlling mechanism only when deenergized.

It further consists in automatic control mechanism for a plurality of electric motors embodying sequence controlling mechanism and actuating means therefor having an electro-magnetic device arranged in series with at least two electric motors and operating when deenergized only to actuate the sequence controlling mechanism.

The invention further consists in the several novel features hereinafter fully set forth and claimed.

The invention is clearly illustrated in the drawing accompanying this specification in which—

Figure 1 is a diagrammatic view of automatic control mechanism for two electric motors, illustrating one embodiment of the present invention;

Fig. 2 is a detail side elevation of the sequence controlling mechanism and an element of its actuating means;

Fig. 3 is a detail vertical longitudinal section of said element of the actuating means, the line of section being taken at 3—3 in Fig. 4;

Fig. 4 is a detail vertical cross section taken on the line 4—4 of Fig. 2; and

Fig. 5 is a plan of the parts seen in Fig. 2.

Referring to said drawing, and first to Fig. 1, which is merely diagrammatic or schematic and illustrative of one embodiment of the invention, the reference characters A and B designate two electric motors which may be used for any suitable purpose, among which is that of operating pumps A' and B', such as liquid, gas, sewage and other pumps. For the purpose of illustration merely, the pumps are shown in connection with a tank or other receptacle C and may be used for supplying pressure, or building up vacuum in said tank, or for pumping liquid into or out of the tank or other receptacle.

Associated with the tank or other receptacle C are two automatically acting switches D and E, here shown in the form of pressure or vacuum switches having diaphragms d and e connected to the tank C by pipes d' and e'. Said automatically acting switches D and E may be in the form of float switches connected with the tank C, as is well understood by those skilled in the art to which this invention pertains.

In the embodiment of the invention illustrated, the switch D is set to close the electric circuit for either of the motors A or B before the switch E is affected by the change of a condition taking place in the tank C. For instance, if the pumps A' and B' are used for building up vacuum in the tank C, the switches D and E will be in the form of vacuum switches and the switch D will be set to close the circuit for either motor whenever the vacuum in the tank C is reduced to a predetermined pressure, whereas the switch E is set to close the circuit for either motor in case the vacuum in the tank C is reduced somewhat below that required to close the switch D. The purpose of the switch E is to close the circuit to the idle motor in case the active one is unable to build up the vacuum required in the tank.

It will be understood that whenever the pumps are employed for creating pressure in the tank, the switch D is set to close the circuit in case the pressure in the tank falls below a required pressure and the switch E is set to close the circuit for the idle motor in case the active motor is unable to build up the required pressure. Furthermore, in case the switches D and E are in the nature of float switches, one switch is set to close the circuit in advance of the other upon a change of the level of the liquid in the tank or receptacle.

The sequence controlling mechanism illustrated is in the form of a double throw switch F and actuating means G therefor. As shown, the double throw switch F has four movable contact pieces or blades $f^1$, $f^2$, $f^3$ and $f^4$ rigidly mounted on and insulated away from a shaft $f$ carried in brackets that are mounted upon a block F' of insulating material. The respective ends of the movable contact pieces are adapted to contact with stationary contact pieces $f^a$, $f^b$, $f^c$ and $f^d$ at one end and with stationary contact pieces $f^e$, $f^f$, $f^g$ and $f^h$ at the other end. An electric conductor $f^5$ connects the stationary contact pieces $f^e$ and $f^c$; an electric conductor $f^6$ connects the stationary contact pieces $f^f$ and $f^d$; an electric conductor $f^7$ connects the stationary contact pieces $f^g$ and $f^a$, and an electric conductor $f^8$ connects the stationary contact pieces $f^h$ and $f^b$.

The actuating means for the double throw switch F is in the form of an electro-magnetic device, here shown as comprising a solenoid $g$, the core $g'$ of which actuates certain transfer mechanism H and therewith the double throw switch F' when the solenoid is deenergized. If desired, the core $g'$ may operate under the influence of gravity to actuate the transfer mechanism H, or, if desired, it may act under the influence of a compression spring $g^2$ arranged behind the core and adapted to be compressed thereby when the solenoid is energized.

For shifting the movable contact pieces or blades of the double throw switch so as to make alternate contact with the two sets of stationary contact pieces, the motion transfer mechanism H is provided between the solenoid $g$ and the shaft $f$ of the double throw switch F and the simple form of such transfer mechanism as illustrated in the drawing will now be described.

Referring to Figs. 2 to 5, a housing 6 is shown in which is rotatably mounted a rocking or oscillating transfer member 7 which normally stands in an inclined position. Said transfer member 7 is mounted upon a shaft 8 secured in the side walls 9 and 10 of the housing 6 and is provided with an upwardly tapered block 11 having two arms or lugs 12 and 13 upon its lower end which extend at right angles to the major axis of the tapered block 11. The arms 12 and 13 are arranged to alternately impinge against a bar 14 rigidly fastened upon the shaft $f$ of the double throw switch to thereby oscillate said shaft in its bearing and move the movable contact pieces $f^1$, $f^2$, $f^3$, $f^4$, into alternate engagement with the stationary contact pieces $f^a$, $f^b$, $f^c$, $f^d$ and $f^e$, $f^f$, $f^g$ and $f^h$.

Connecting the upper end of the tapered block 11 with a stationary part of the housing, such as a lug 6$^a$, located in vertical alignment with the axis of the shaft 8, is a coiled tension spring 15, see Figs. 2 and 4, which acts to quickly move the transfer member 7 into either of its inclined operative positions whenever its major axis is moved past a vertical line extending through the axis of its shaft. For the purpose of holding the movable contact pieces or blades of the double throw switch in contact with the respective stationary contact pieces, a coiled tension spring 16 is provided between some stationary place on the housing 6 and an arm 17 that is secured to and projects down from the shaft $f$. The upper end of the spring 16 is located in a vertical line extending through the axis of the shaft $f$, so that whenever the point of attachment of the coiled spring 16 to the arm 17 is moved past such vertical line, the spring 16 acts to quickly urge the movable contact pieces into contact with the stationary ones that are located on that side which has been moved down.

The core $g'$ of the solenoid is arranged to rock or oscillate the transfer member 7 upon its shaft and thereby throw the double throw switch. As shown, a link 19 is connected to the core $g'$ and has a roller 19 upon its lower end which is arranged to travel between the end walls 20 and 21 of the housing 6 and the tapered block 11 of the transfer member 7. The arrangement of the parts is such that when the tapered block 11 occupies the inclined position seen in solid lines in Fig. 3, the roller 19 will move down through the wide space between the end wall 20 and the tapered block 11 and at the lower limit of its movement, the roller 19 encounters the arm 12, thereby swinging the transfer member 7 over from the position shown in solid lines in Fig. 3 to the position indicated in dotted lines in said figure, thereby impinging the arm 12 against the bar 14 and swinging said bar and therewith the shaft $f$ and movable contact pieces thereon into the position indicated in dotted lines in Fig. 3. This downward movement of the link 18 and roller 19 takes place whenever the solenoid becomes deenergized after having been energized, thus causing the double throw switch to be actuated when the circuit therethrough is open.

Whenever the solenoid is next energized, the core $g'$ is drawn upward and the roller 19 is moved upward passing along the tapered block 11 without moving it past the dead center. When the roller is subsequently lowered, it travels down along the right hand side of the tapered block and returns the transfer member 7 and therewith the movable contact pieces back to their former position.

The motors A and B are connected to the main lines M in which are located starting switches S, S'. The electric circuits between the automatic switches D and E and the motors A and B can be readily traced in Fig. 1:

Starting from the automatic switch D (which is shown closed) the circuit leads therefrom through the electric conductor $a$ to the windings $g^3$ of the solenoid $g$ and thence to the movable contact piece $f'$ of the double throw switch. From the stationary contact piece $f^e$ (which is in contact with the movable contact piece $f'$) the circuit leads through the conductor $f^5$ to the conductor $a'$, thence to the starting switch S of the motor A and from the starting switch S back through the conductor $a^2$ to the conductor $f^6$ and thence to the stationary contact piece $f^i$ (which is in contact with the movable contact piece $f^2$) and from said movable contact piece $f^2$ to conductor $a^3$ back to the closed switch D. With the circuit just described closed, the motor A is in operation and the motor B is idle. The solenoid $g$ having been energized, the core $g'$ is drawn upward to the limit of its movement and the roller 19 is held at the upper end of the housing and above the tapered block 11.

The circuit from the open switch E to the motor B may be traced through the conductor $a^4$ through the windings $g^4$ of the solenoid $g$ and thence to the movable contact piece $f^3$ of the double throw switch, thence from the stationary contact piece $f^g$ the conductors $f^7$ and $b'$ to the starting switch S' and thence back through the conductors $b^2$ and $f^8$ to the stationary contact piece $f^h$; through the movable contact piece $f^4$ and back through the conductor $a^5$ to the switch E.

When the movable contact pieces of the double throw switch have been moved to the position indicated by the dotted lines in Fig. 3, the movable contact pieces $f'$, $f^2$, $f^3$ and $f^4$ are in contact with the contact pieces $f^a$, $f^b$, $f^c$ and $f^d$ and contact is broken between the movable contact pieces and the other stationary contact pieces $f^e$, $f^f$, $f^g$ and $f^h$. The circuit from the closed switch D to the motor B is then closed and may be traced from the switch D to the double throw switch as before, but the circuit now leads from the conductor $a$ through the contact pieces $f'$ and $f^a$ and conductors $f^7$ and $b'$ through the starting switch S' of the motor B and back through the conductors $b^2$ and $f^8$, contact pieces $f^b$ and $f^2$ and through the conductor $a^3$ to the closed switch D.

In the operation of the control mechanism, and assuming the automatic switch D to be closed and the motor A running, the solenoid $g$ energized and the roller 19 held at the upper limit of its stroke with the contact pieces of the double throw switch closed, as seen in Figs. 1 and 2 and in solid lines in Fig. 3, the automatic switch D remains closed until the pressure in the tank C has been restored to normal, whereupon the pressure switch D is opened and the circuit broken at said switch D and the motor A is stopped. At the same time, the solenoid $g$ is deenergized, whereupon the core $g'$ moves down under the influence of gravity or is urged down by the spring $g^2$, thereby moving the roller 19 down along the left hand side of the tapered block 11, as viewed in Fig. 3, until said roller 19 strikes the arm 12 and swings the transfer member 7 into the position, seen in dotted lines in Fig. 3, the coiled spring 15 acting to yieldingly hold the transfer member 7 in the inclined position imparted to it by the roller 19.

As the tranfer member 7 is being swung over from the solid line position to the dotted line position, its arm 12 engages the left hand side of the bar 14 and swings the same downward and therewith rocks the shaft $f$ and swings down the left hand end of the movable contact pieces of the double throw switch into contact with the stationary contact pieces on that side of the switch, thereby placing the motor B in the circuit. All of this takes place while the motors are idle. The parts remain in their new position until the switch D is again closed and the solenoid again energized, at which time the roller 19 is again moved to the upper limit of its travel. The motor B is now in operation and when the circuit through the switch D is again broken, the motor B is stopped and the roller 19 permitted to travel down along the right hand side of the tapered block 11, thereby swinging the transfer member 7 back to its former position, and therewith moving the right hand end of the movable contact pieces back into contact with the stationary contact pieces at the right hand side of the double throw switch, thus again placing the motor A in the circuit. From the above it is apparent that each time the circuit is closed through the automatic switch D, the circuit is closed through the solenoid and through the circuit leading to one of the motors A or B, and that each time that the switch D is opened, the double throw switch is actuated, thereby establishing the circuit alternately through the two motors A and B while they are at rest.

In the event that the motor, which is in operation, is unable to perform the work required of it, and the pressure in the tank changes sufficiently to close the switch E, the idle motor is started, and both continue to run until the required vacuum or pressure is built up, whereupon the automatic switches D and E are opened and both motors stopped. The solenoid being deenergized, the core moves downward as before described, thereby throwing the double throw switch while the motors are idle. While the winding $g^4$ for the solenoid is shown in the circuit leading from the switch E, this is not necessary to the operation of the mechanism when the switch D is set to operate in advance of the switch E, but there are cases where it might be found desirable to set the switch E to operate in advance of the switch D, and this may be done by providing a solenoid winding in each circuit.

A double throw switch has been illustrated for causing the alternate operation of the electric motors, but any other equivalent device may be used which performs the same function as a double throw switch. The transfer mechanism for transferring the downward movement of the core of the solenoid to the double throw switch may, of course, take other forms than the one illustrated, so long as it operates to throw the double throw switch when the electric current is shut off and the motors are idle. It is to be understood that where the expression "motor" or "electric motor" is used in the following claims, it includes devices or machines which when supplied with energy impart motion or perform work. It is also to be understood that the expression "automatically acting switch" in the following claims includes a pressure switch, vacuum switch, float switch, thermostatic switch or other switch responsive to changes of conditions taking place.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. Automatic control mechanism for a plurality of electric motors comprising in combination sequence controlling mechanism for controlling the sequence of operation of a plurality of motors, actuating means for said sequence controlling mechanism including an electro-magnetic device operating solely when deenergized to actuate the sequence controlling mechanism, and sequentially operable switches, at least one of which is in series with said electro-magnetic device, for closing circuits for said motors and through said electro-magnetic device and said sequence controlling mechanism.

2. Automatic control mechanism for a plurality of electric motors comprising in combination sequence controlling mechanism for controlling the sequence of operation of a plurality of motors, actuating means for said sequence controlling mechanism including a solenoid operating solely when deenergized to actuate said sequence controlling mechanism, and sequentially operable switches, at least one of which is in series with the solenoid, for closing circuits for said motors and through said solenoid and said sequence controlling mechanism.

3. Automatic control mechanism for a plurality of motors comprising in combination a double throw switch for controlling the sequence of operation of a plurality of motors, actuating means for said double throw switch including an electro-magnetic device operating solely when deenergized to actuate said sequence controlling mechanism, and sequentially operable switches, at least one of which is in series with the electro-magnetic device, for closing circuits for said motors and through said electro-magnetic device and said sequence controlling mechanism.

4. Automatic control mechanism for a plurality of electric motors comprising in combination a double throw switch for controlling the sequence of operation of a plurality of motors, actuating means for said double throw switch including a solenoid operating solely when deenergized to actuate said double throw switch, and sequentially operable switches, both in series with separate winding of the solenoid, for closing circuits for said motors and through said solenoid and said double throw switch.

5. Automatic control mechanism for a plurality of electric motors comprising in combination sequence controlling mechanism for controlling the sequence of operation of a plurality of motors, actuating means for said sequence controlling mechanism including an electro-magnetic device operating solely when deenergized to actuate the sequence controlling mechanism, and a pressure switch in series with said electro-magnetic device, for closing circuits for said motors and through said electro-magnetic device and said sequence controlling mechanism.

6. Automatic control mechanism for a plurality of electric motors comprising in combination sequence controlling mechanism for controlling the sequence of operation of a plurality of motors, actuating means for said sequence controlling mechanism including a solenoid operating solely when deenergized to actuate said sequence controlling mechanism, and a pressure switch in series with said solenoid, for closing circuits for said motors and through said solenoid and said sequence controlling mechanism.

7. Automatic control mechanism for a plurality of motors comprising in combination a double throw switch for controlling the sequence of operation of a plurality of motors, actuating means for said double throw switch including an electromagnetic device operating solely when deenergized to actuate said sequence controlling mechanism, and a pressure switch in series with said electro-magnetic device, for closing circuits for said motors and through said electro-magnetic device and said sequence controlling mechanism.

8. Automatic control mechanism for a plurality of electric motors comprising in combination a double throw switch for controlling the sequence of operation of a plurality of motors, actuating means for said double throw switch including a solenoid operating solely when deenergized to actuate said double throw switch, and a pressure switch in series with said solenoid for closing circuits for said motors and through said solenoid and said double throw switch.

9. Automatic control mechanism for a plurality of electric motors comprising in combination a double throw switch for controlling the sequence of operation of a plurality of motors, actuating means for said double throw switch including a solenoid arranged in series with said double throw switch, said solenoid operating solely when deenergized to actuate said double throw switch, and a pressure switch in series with said solenoid and double throw switch, for closing circuits for said motors and through said solenoid and said double throw switch.

10. Automatic control mechanism for a plurality of electric motors comprising in combination a double throw switch for controlling the sequence of operation of a plurality of motors, actuating means for said double throw switch including a solenoid and a transfer member for transferring endwise movement of the core of the solenoid in one direction to the double throw switch, said solenoid operating solely when deenergized to actuate said double throw switch, and a sequentially operable switch in series with said solenoid, for closing circuits for said motors and through said solenoid and said double throw switch.

11. Automatic control mechanism for a plurality of motors comprising in combination an automatically acting electric switch for starting and stopping the operation of a plurality of motors, said switch being responsive to changes of conditions which take place in a system with which the motors are used, and sequence controlling mechanism co-operating with said switch for controlling the sequence of operation of the motors, said sequence controlling mechanism having actuating means including a solenoid in series with said electric switch operating solely when deenergized to actuate the sequence controlling mechanism.

12. Automatic control mechanism for a plurality of motors comprising in combination an automatically acting electric switch for starting and stopping the operation of a plurality of motors, said switch being responsive to changes of conditions which take place in a system with which the motors are used, sequence controlling mechanism co-operating with said switch for controlling the sequence of operation of the motors, said sequence controlling mechanism having actuating means including a solenoid in series with the electric switch operating solely when deenergized to actuate the sequence controlling mechanism, and a second automatically acting electric switch in series with said sequence controlling mechanism and acting under an abnormal condition in the system to start an idle motor when another is in operation.

13. Automatic control mechanism for a plurality of motors comprising in combination a pressure switch, sequence controlling mechanism co-operating with said pressure switch for controlling the sequence of operation of a plurality of motors, said sequence controlling mechanism having actuating means including a solenoid in series with said pressure switch and operating solely when deenergized to actuate the sequence controlling mechanism, and a second pressure switch co-operating with said sequence controlling mechanism and acting under an abnormal condition to start an idle motor when another is in operation.

14. Automatic control mechanism for a plurality of motors comprising in combination a pressure switch for starting and stopping the operation of a plurality of motors, a double throw switch co-operating with said pressure switch for controlling the sequence of operation of the motors, actuating mechanism for said double throw switch including a solenoid in series with said pressure switch operating solely when deenergized to actuate said double throw switch, and a second pressure switch co-operating with said double throw switch and acting under abnormal conditions to start an idle motor when another is in operation.

15. Automatic control for a plurality of mechanisms comprising in combination an automatic switch for starting and stopping the operation of a plurality of mechanisms, a sequence controlling mechanism co-operating with said automatic switch for controlling the sequence of operation of said mechanisms, and actuating means for said sequence controlling mechanism including an electro-magnetic device in series with said automatic switch, and operating solely when deenergized to actuate said sequence controlling mechanism.

16. Automatic control for a plurality of mechanisms comprising in combination an automatic switch for starting and stopping the operation of a plurality of mechanisms, a double throw switch co-operating with said automatic switch for controlling the sequence of operation of said mechanisms, and actuating means for said double throw switch including a solenoid in series with said automatic switch, and operating solely when deenergized to actuate said double throw switch.

17. Automatic control for a plurality of mechanisms comprising in combination an automatic switch for starting and stopping the operation of a plurality of mechanisms, a sequence controlling mechanism co-operating with said automatic switch for controlling the sequence of operation of said mechanisms, actuating means for said sequence controlling mechanism including an electro-magnetic device in series with said automatic switch and operating solely when deenergized to actuate said sequence controlling mechanism, and a second automatic switch acting under abnormal conditions and co-operating with said sequence controlling mechanism to start an idle mechanism when another one is in operation.

18. Automatic control for a plurality of pump motors comprising in combination a pressure switch adapted to be connected to a tank and operating to start and stop a plurality of motors, a double throw switch co-operating with said pressure switch for controlling the sequence of operation of the motors, an electromagnetic device in series with the pressure switch and operating solely when deenergized to actuate the double throw switch, and a second pressure switch co-operating with the double throw switch and adapted to be connected to the tank and operating under abnormal conditions to start an idle motor when another one is in operation.

19. In combination, two electric motors, circuits therefor, sequentially operable electric switches for controlling said circuits, sequence controlling switch mechanism for controlling sequential operation of the motors, an electromagnetic device for setting said sequence controlling switch mechanism in operative position for actuation, whereby the switch mechanism operates solely to transpose the electric circuits solely when the electro-magnet is de-energized, said electro-magnetic device having two coils, each in series with an electric switch and with contacts of the sequence controlling switch mechanism.

20. In combination, two electric motors, circuits therefor, sequentially operable electric switches for controlling said circuits, a double throw switch having contacts in the circuits for the two motors, and electro-magnetic mechanism for actuating said double throw switch, said electro-magnetic mechanism having two coils, each in series with an associated electric switch.

21. In combination, two electric motors, a main circuit for each motor, and control circuits connected with the main circuits, for starting the motors in alternate sequence, in which control circuits are comprised a pilot switch, and a sequence controlling switch mechanism having an electro-magnetically operated device for actuating switch contacts of the switch mechanism solely when the electro-magnet thereof is de-energized, said electro-magnet being in series with said pilot switch, and the parts of the control circuits included between the sequence controlling switch mechanism and each main circuit being separate and independent of each other.

22. In combination, two electric motors, a main circuit for each motor, and control circuits connected with the main circuits, for starting the motors, in which control circuits are comprised two sequentially operable pilot switches, and a sequence controlling switch mechanism for the motors, having an electro-magnetically operated device for actuating the switch contacts of the switch mechanism solely when the electro-magnet thereof is de-energized, said electro-magnet being in series with at least one of said pilot switches, and the parts of the control circuits, included between the sequence controlling switch mechanism and each main circuit, being separate and independent.

23. In combination, two electric motors, a main circuit for each motor, control circuits for starting and stopping the motors, said control circuits being separately connected to the main circuits, sequentially operable pilot switches and a sequence controlling switch in said control circuits, each pilot switch being in series with the sequence controlling switch, and an electromagnetic device having means to actuate said sequence controlling switch, said electro-magnetic device having two coils, each connected to a main circuit and controlled by a pilot switch.

AUGUSTUS C. DURDIN, Jr.